Dec. 19, 1939.         B. PEDERSEN         2,183,584
ELECTRICAL INDICATOR AND CONTROL MEANS FOR IMPURITIES IN SOLUTION
Filed Jan. 23, 1936        3 Sheets-Sheet 1

Inventor
Bjarne Pedersen
By Vernon E. Hodges and
N. Hamlin Hodges
his Attorneys

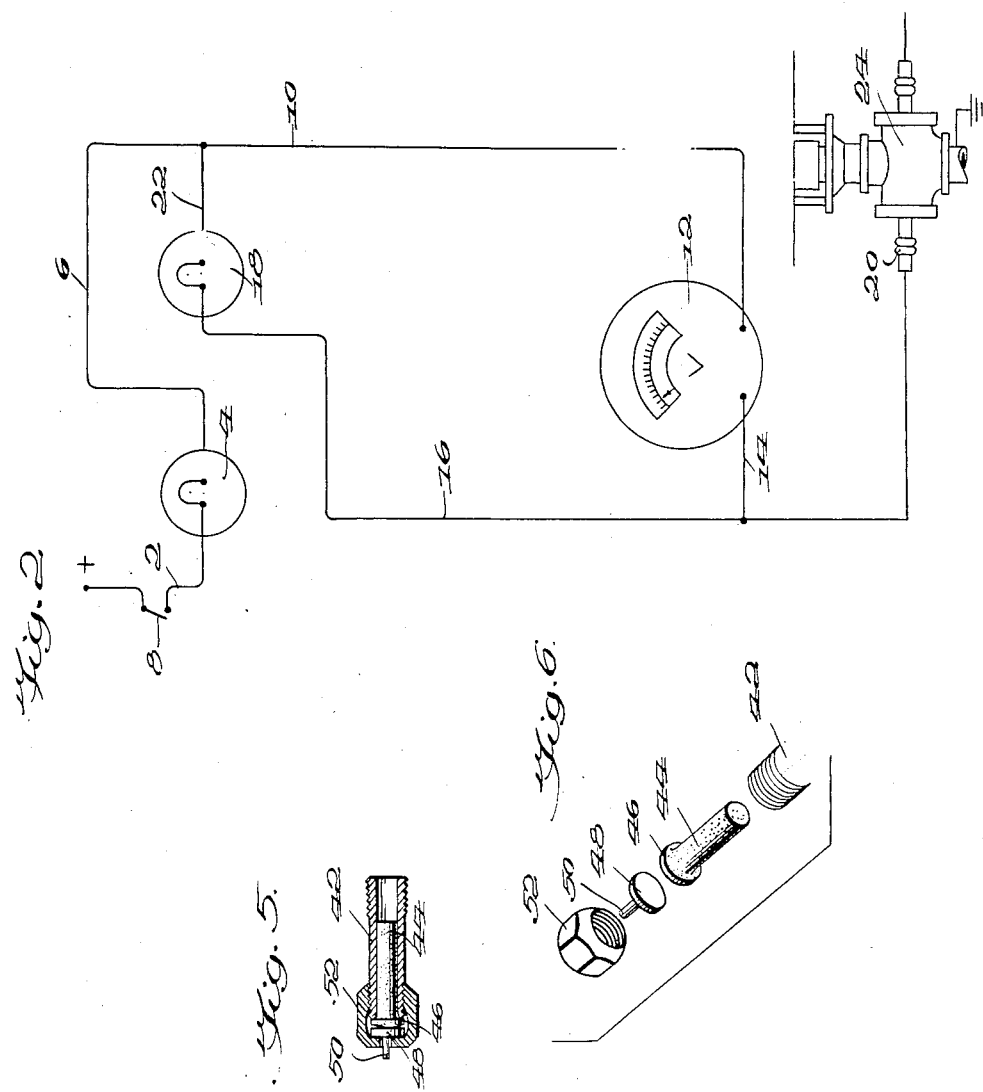

Dec. 19, 1939.  B. PEDERSEN  2,183,584
ELECTRICAL INDICATOR AND CONTROL MEANS FOR IMPURITIES IN SOLUTION
Filed Jan. 23, 1936  3 Sheets-Sheet 3
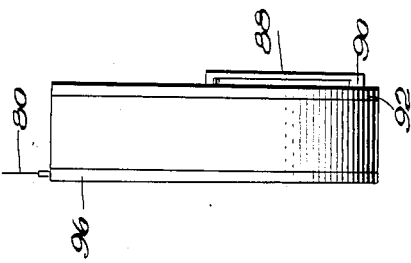
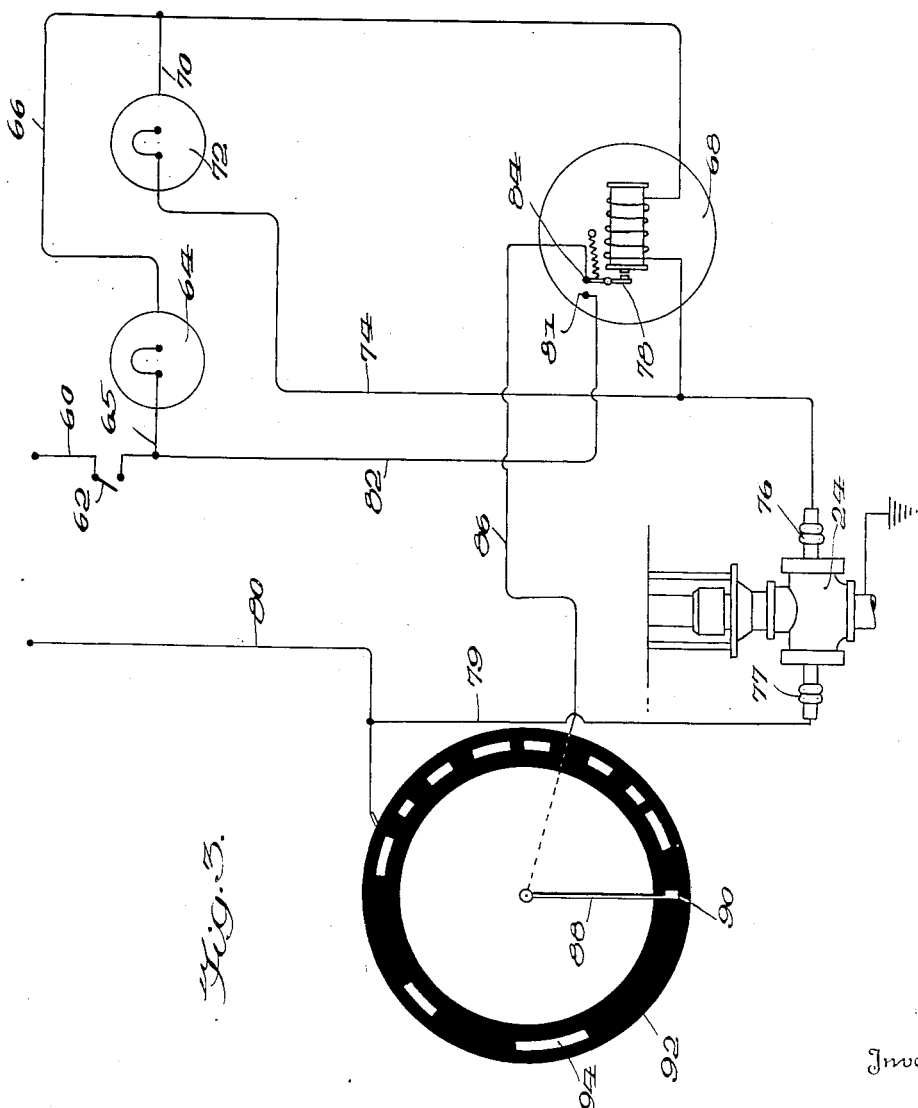

Patented Dec. 19, 1939

2,183,584

UNITED STATES PATENT OFFICE 2,183,584

ELECTRICAL INDICATOR AND CONTROL MEANS FOR IMPURITIES IN SOLUTION

Bjarne Pedersen, West New York, N. J.

Application January 23, 1936, Serial No. 60,525

1 Claim. (Cl. 175—183)

My electrical indicator is adapted by slight changes in the wiring plan to utilize any source of electric current, either A. C. or D. C.

It may be well to state at the outset that under ordinary circumstances only one side of the line from the source of electric power is utilized. It is believed to be generally known that commercial electric power, whether A. C. or D. C., is grounded at the generating station. This being the case, I utilize an indirect connection with the ground as the return path for the current I use for the operation of my testing device.

This electrical indicator may be utilized for innumerable tests where it is desirable to ascertain the amount of impurities in a solution which is to be tested. Thus far I have utilized my testing device in conjunction with a laundry machine to determine when the solution within the washing wheel has reached a point of impurity so that the water should be changed. It would be difficult to specifically state all of the various uses to which my testing device may be applied, but generally speaking, it at present seems positive that my testing device may be used in any solution which necessitates repeated testing to ascertain whether or not the solution is in proper condition for use, or to indicate the amount of impurities which are in a given solution. For example it may be used in paper mills, dye works, water works (both for water supply and for sewerage), power plant boilers, and in general medical science where testing is to be done.

In the accompanying drawings:

Fig. 2 is a diagrammatic wiring plan showing a slightly modified circuit;

Fig. 3 is a diagrammatic wiring plan showing the use of a contact disc adapted to be utilized in conjunction with a plurality of relays for operating electric valves for controlling fluids in several tanks or pipes;

Fig. 4 is a side elevation of the contact disc;

Fig. 5 is a cross-section of a contactor through which current passes into a solution being tested; and Fig. 6 is a disassembled view of the contactor shown in Fig. 5.

Figure 1:
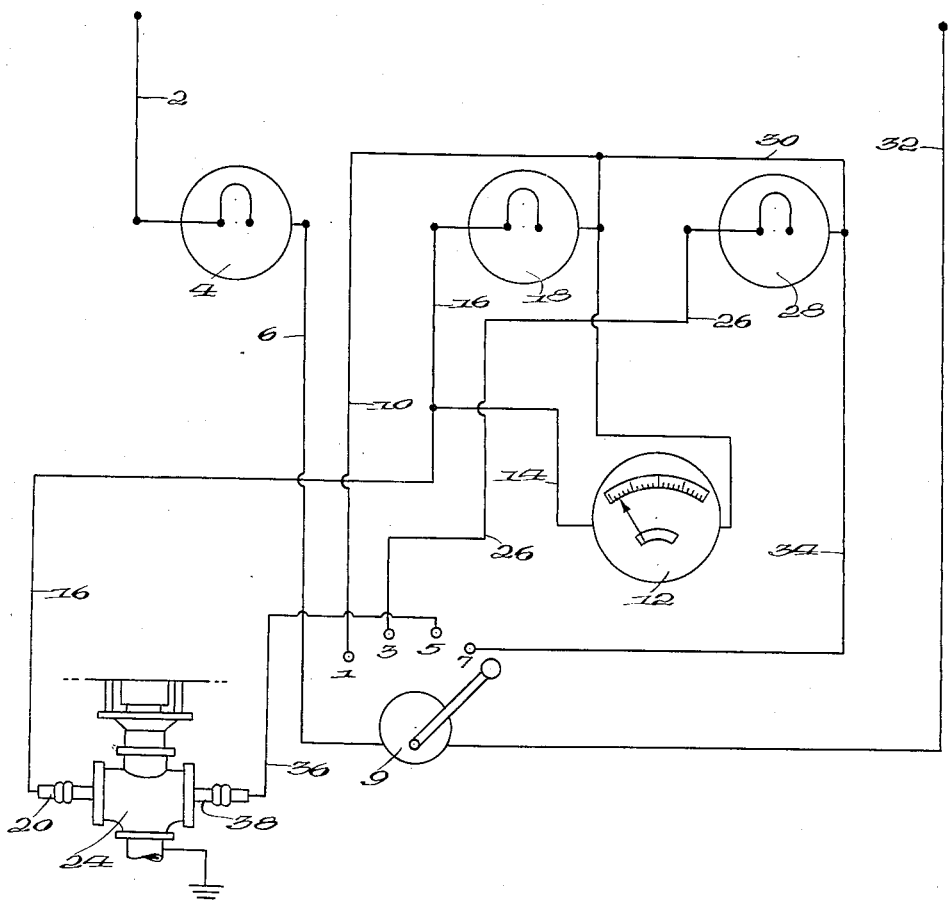
Fig. 1 is a diagrammatic wiring plan of my preferred form of electrical indicator.

In the wiring plan shown in Fig. 1, I utilize an ordinary wire 2, which is adapted to be attached to one side of a conventional direct or alternating current outlet. This wire 2 is connected to the filament of a light 4, which light is attached on the shell side thereof to a wire 6 which is attached to a special switch 9, adapted for turning the current on or off, and for connecting different circuits.

The switch 9 is provided with four separate contact points 1, 3, 5, and 7. From the contact point 1, I provide a wire 10 which is connected with the shell side of a light 18. A wire 16 extends from the filament of the light 18 to a specially constructed contactor 20 (which will be more fully described hereinafter) mounted in a pipe coupling 24. One post of a suitable volt meter or volt recorder 12 is connected to the wire 10 while the other post of the volt meter 12 is connected by a suitable wire 14 to the wire 16.

It will be obvious by following this wiring plan that the lights 4 and 18 are in series between the source of supply of electricity and the contactor 20, which is in indirect contact with the ground through a solution which is within the coupling 24. The volt meter 12 is in a shunt field around the light 18.

The solution within the coupling 24 is supplied thereto by the coupling being mounted on any tank which may contain the fluid to be tested, and it will be understood that inasmuch as pure water is a poor conductor of electricity, very little, if any, electricity will flow through the circuit when the solution within the coupling 24 is pure. As the solution within the coupling 24 becomes impure, current will flow through the circuit igniting the lights 4 and 18 dimly and showing a relatively low reading on the volt meter 12. As impurities are added to the solution the contact between the contactor 20 the coupling 24, and subsequently the ground, will become more perfect, and consequently the lights 4 and 18 will burn with more brilliance and the reading on the volt meter 12 will be higher.

The reason for this change in the intensity of the lights 4 and 18, and the reading on the volt meter 12 is that as the solution within the coupling 24 becomes more impure a greater conductivity is set up therein, and the flow of current will increase, thus causing the lights 4 and 18 to increase in brilliancy and the reading on the volt meter to increase as more electricity flows through the circuit.

Of course, it will be understood that when a test of the solution within the coupling 24 is to be made the switch 9 will be in contact with either the contact point 1, 3, 5, or 7.

The above described circuit will utilize the lights 4 and 18 and the volt meter 12, in making a test of the solution within the coupling 24. Other tests of the solution may be made by changing the position of the switch 9 to connect other circuits.

If the switch 9 is placed in contact with the contact point 3, while the wire 2 is connected to one side of a conventional current outlet, the current will then flow through a wire 26 to the filament of a light 28. Since the shell side of the light 28 is connected by the wire 30 to the shell side of the light 18, the current will pass therethrough to the wire 16 and consequently through the contactor 20 and the solution within the coupling 24 to the ground. This circuit will utilize the lights 4, 18 and 28, as well as the volt meter 12.

By using a wire 32, which, like the wire 2 may be connected to one side of a conventional current outlet, and by placing the switch 9 in contact with the contact point 7, the current will flow through the wire 34 to the light 18 and consequently through the wire 16 to the contactor 20 within the coupling 24. This test will utilize only one light, the light 18. Since the volt meter 12 is in a shunt field around the light 18, it will be obvious that the volt meter will also function.

The contact 5 is connected by the wire 36 to the contactor 38 positioned within the coupling 24 and is thus indirectly connected with the ground. It will be obvious from the wiring plan that when the switch 9 is in contact with the contact point 5 and the source of supply of electricity is from the wire 2, the current will flow through the light 4, the contactor 38, and the solution in the coupling 24 to the ground, and the light 4 only will be in the circuit. Hence the brilliancy of the light 4 will be dependent on the impurities in the solution.

It may readily be seen that by the use of the switch 9 and either the wire 2 or 32 several different circuits may be utilized. The possible circuits being as follows; the light 4 alone; the lights 4 and 18 and the volt meter 12; the lights 4, 18, and 28 and the volt meter; the light 18 and the volt meter; or the lights 18 and 28 and the volt meter.

In Fig. 2, I have shown a slightly modified wiring plan which is adapted for only one possible circuit with the wire 2 being connected with one side of a source of supply of electricity from a conventional outlet. The reference characters for Fig. 2 correspond with those in Fig. 1, except that in this circuit I utilize a conventional switch 8 in place of the special switch 9.

This modified and simplified form of my device is well adapted to many uses when it is not necessary to make several different tests of the solution being tested.

I have shown a cross-section through the contactor 20 or 21, in Fig. 5, and have shown a disassembled view thereof in Fig. 6. This contactor consists of a tube 42 of suitable insulating material which is provided with screw threads at both ends thereof. Within the tube 42, I have placed a contacting element 44, which is preferably made of either carbon or of a magnetized metal. One end of this contact element 44 is flared out as at 46, and is adapted to be held in contact with a metallic button 48, which is preferably made of copper and is provided with an outstanding projection 50, which projection passes through a suitable hole in the nut 52 which is made of insulating material. The projection 50 is adapted to be connected in any suitable manner to the wire 16, 36, 74, or 79.

After the contacting element 20 has been assembled, as above described, and as shown in Fig. 5, it is placed within the coupling 24, as diagrammatically shown in Figs. 1, 2, and 3.

The purpose of this contactor being made in the manner above described, is that the contacting element 44 is positioned within the tube 42, so that it is held a substantial distance away from any metallic portion of the coupling 24. Consequently any current which flows from the contacting element 44 to the coupling 24, and subsequently to the ground, must pass a considerable distance through the solution within the coupling 24. This arrangement assures that a direct connection will never be made with the ground, and therefore the flow of the current will at all times be dependent upon the solution within the coupling 24. It will be understood that a testing of the impurities in the solution may readily be made by studying the brilliancy of either the light 4, or the lights 4 and 18, or 4, 18 and 28, or 18 and 28 and the volt meter 12. It will be understood that when the switch 9 is in contact with the contact point 5 the volt meter will not be connected in the circuit, and will consequently remain at a "zero" reading.

It is to be understood that there is no return path for the electricity, and therefore the resistance of the filaments of the lights will be equal to the voltage indicated on the meter and will determine the brilliancy of the lights. If the conductivity set up within a solution should at any time become greater than the conductivity of the filaments of the lights, the lights would merely burn out and act in the same manner as a fuse. Such a possibility is quite remote.

As I have shown in Fig. 3, I have adapted my testing device to be utilized with a separate automatic control for controlling the necessary valves and connections to regulate the flow of different fluids into the container in which the fluid being tested is located.

The arrangement which I have shown in Fig. 3 is adapted to be used primarily for alternating current but may be used with direct current also. In this circuit, I connect one side of the source of supply to the wire 60, which wire is provided with a switch 62, and is connected with the filament of a light 64 by the wire 65, from the shell side of which the wire 66 extends to a two-phase relay which is diagrammatically represented within the circle 68. Spliced to this wire 66, I provide a wire 70, connected with the shell side of a light 72, the filament of which is connected to a wire 74. The opposite end of the wire 74 is connected to a contactor 76, similar to the contactors described above. The relay 68, is spliced on this wire 74, and consequently is in shunt across the light 72. The contactor 77 is secured within the coupling 24 in the same manner as the contactor 76, and is connected directly by a wire 79 to the wire 80 which extends to the other side of the source of supply. With this circuit arranged in the above described manner, it is the same as the circuits described above, with the exception of the relay 68, taking the place of the volt meter 40. (It will be understood that the wire 79 may be dispensed with entirely if desired.)

The two-phase relay 68, is adapted to utilize a low voltage when such a voltage passes through the solution being tested. As the voltage increases the relay becomes energized and the magnet thereof pulls the pivoted switch 78, and thereby makes a contact between the contact point 81, on the wire 82, and the contact point 84 on the wire 86.

The wire 82 is spliced to the wire 65, and is thereby connected to one side of the source of supply through the switch 62, and the wire 60.

The wire 86 is connected with an arm 88, which is provided with a contact point 90 at the outer end thereof. The arm 88 is mounted on a suitable device which rotates the arm at a predetermined speed and makes the contact point 90 revolve about the disc of insulating material 92, and progressively come into contact with the several contact points 94.

These several contact points 94 are suitably connected with a plurality of relays which may be adapted to work similarly to the relay 68, but which are not shown. The return wires from these several relays are attached to a suitable contact member 96, and through that member 96 to the wire 80, and thence to the other side of the source of supply. The current being supplied to these relays being entirely separate from the current passing through the lights 64 and 72, the relay 68 and the contactors 76 and 77.

It will be understood that the operation of this device is as follows:

The solution being tested will provide the means by which the contactor 76 may be placed in contact indirectly with the contactor 77, and thereby the lights 64 and 72 will be lighted and the relay 68 will be energized to pull the switch 78 and make a contact between the points 81 and 84, thus connecting an external circuit with the clockworks operated arm 88. The arm 88 is adapted to revolve around the insulation disc 92 at a predetermined speed, and to make contact between the contact point 90 of the arm 88 and the several contact points 94 in the insulating disc 92. These several contact points 94 are adapted to be connected with a plurality of relays, which relays are adapted to make the necessary contacts to operate electric valves or other desirable devices. While one wire to these relays is secured to the contact points 94, the other wire therefrom will be suitably secured to the contact member 96, and from that contact member to the wire 80 and to the other side of the source of supply.

I have described the relay 68 as being a two-phase relay. By a two-phase relay I means one which is adapted to commence its operation on the low voltage and yet which is adapted to continue to operate without injury on a higher voltage. The reason for this is that when the solution within the coupling 24 is weak a very low voltage is passing therethrough, and after the solution is strengthened by the addition of impurities the voltage increases, the relay may operate.

I have used a voltmeter 12, in my several hook-ups because often it is difficult to see the slight changes in the brilliancy of the lights as the impurities in the solution within the coupling 24 change. The needle on the voltmeter very readily shows slight changes and therefore allows a more accurate reading of the increase of impurities in the solution being tested.

It will be understood that a volt recorder may be substituted for the voltmeter which I have shown, or any other electrical metering device which will serve the same purpose.

Also it will be understood that I may utilize the synchronizer or relay system which is shown in Fig. 3, with any of my circuits if the occasion should arise. It also will be understood, of course, that a transformer may be interposed at any place between point of contact with the source of supply, and the point where the current reaches either the lights or the voltmeter. It is not always necessary to utilize a transformer, in view of the fact that the full voltage of the source of supply may be used without injury to the device. The reason for using a transformer is merely to make the device more economical in its operation.

I claim:

The combination of a coupling adapted to be attached to a tank containing liquid, and into which coupling the liquid from the tank flows, and an electric contact assembly including an insulating tube having a fluid-tight connection with the coupling at an angle which will permit the liquid to freely enter the end of the tube attached to the coupling, a conducting element fitted in the tube and extending throughout a part only of the length of the latter whereby an open space is left at one end of the tube to receive liquid from the coupling, an outwardly extending projection, and a cap having a hole therein through which the projection extends, said cap embracing the projection and attached to the tube for holding the conducting element and projection in electrical contact.

BJARNE PEDERSEN.